United States Patent
Austin et al.

(10) Patent No.: US 6,247,219 B1
(45) Date of Patent: *Jun. 19, 2001

(54) METHOD FOR PRODUCING A VEHICLE HUB, BEARING AND BRAKE DISC ASSEMBLY

(75) Inventors: Vince J. Austin, Plymouth, MI (US); Glenn Kochan, Newport News; Raymond C. Rapisardi, Norfolk, both of VA (US)

(73) Assignee: Kelsey-Hayes Company, Livonia, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/377,946

(22) Filed: Aug. 20, 1999

Related U.S. Application Data (63) Continuation of application No. PCT/US98/03825, filed on Feb. 27, 1998, which is a continuation-in-part of application No. 08/994,904, filed on Dec. 19, 1997, now Pat. No. 5,937,499, and a continuation-in-part of application No. 08/859,696, filed on May 21, 1997, now Pat. No. 5,899,305, and a continuation-in-part of application No. 08/807,079, filed on Feb. 27, 1997, now Pat. No. 5,915,502.

(51) Int. Cl.[7] ............................................ B23P 11/00
(52) U.S. Cl. .................... 29/434; 29/898.09; 82/1.11; 82/112
(58) Field of Search .................. 29/434, 898.09, 29/898.07, 898.062; 82/1.11, 112; 451/902

(56) References Cited

U.S. PATENT DOCUMENTS

| | | |
|---|---|---|
| 1,917,748 | 7/1933 | Blazek . |
| 3,540,165 | 11/1970 | Lanham . |
| 3,555,940 | 1/1971 | Cooper . |
| 3,665,657 | 5/1972 | Lill . |
| 3,757,883 | 9/1973 | Asberg . |
| 4,042,422 | 8/1977 | Asberg . |
| 4,262,452 | 4/1981 | Lopez . |
| 4,478,116 | 10/1984 | Fuller . |
| 4,874,064 | 10/1989 | Oono . |
| 5,430,926 | 7/1995 | Hartford . |
| 5,653,153 | 8/1997 | Greenwald . |

FOREIGN PATENT DOCUMENTS

| | | |
|---|---|---|
| 1477382 | 10/1969 | (DE) . |
| 122143 | 10/1984 | (EP) . |

Primary Examiner—P. W. Echols
(74) Attorney, Agent, or Firm—MacMillan, Sobanski & Todd, LLC (57) ABSTRACT

This invention relates to method for fabricating a vehicle hub, bearing and brake disc assembly wherein the brake surface of the brake disc is oriented in a predetermined relationship relative to the outer race of the bearing assembly. The method comprises the steps of: (a) providing a vehicle hub including a hub flange; (b) providing a bearing assembly having an outer race; (c) installing the bearing assembly about the vehicle hub; (d) providing a separately formed brake disc having a brake surface; (e) securing the brake disc to the hub flange of the vehicle hub to produce a vehicle hub, bearing and brake disc assembly; (f) supporting the vehicle hub, bearing and brake disc assembly on a machining apparatus; and (g) using the machining apparatus to machine the brake surface of the brake disc of the vehicle hub, bearing and brake disc assembly whereby the brake surface is oriented in a predetermined relationship relative to the outer race of the bearing assembly.

20 Claims, 12 Drawing Sheets

METHOD FOR PRODUCING A VEHICLE HUB, BEARING AND BRAKE DISC ASSEMBLY

CROSS-REFERENCE TO RELATED APPLICATIONS

This patent application is a continuation of PCT/US98/03825, filed Feb. 27, 1998, which is a continuation-in-part of U.S. Ser. No. 08/807,079, filed Feb. 27, 1997, now U.S. Pat. No. 5,915,502; U.S. Ser. No. 08/859,696, filed May 21, 1997, now U.S. Pat. No. 5,899,305; and U.S. Ser. No. 08/994,904, filed Dec. 19, 1997 U.S. Pat. No. 5,937,499.

BACKGROUND OF THE INVENTION

The subject invention relates to in general to vehicle brakes and, more specifically, to a method for producing a vehicle hub, bearing and brake disc assembly used in such a vehicle brake system.

With the advent of front wheel drive vehicles and disc brakes, the assembly which is driven by the drive shaft comprises a vehicle hub presenting a hub flange supporting a brake disc having opposed brake surfaces and with a bearing assembly surrounding the vehicle hub with an outer race presenting a bearing flange for attachment to a steering knuckle of a vehicle. When fully assembled on the vehicle, the brake surfaces of the disc rotor are disposed adjacent a pair of brake pads of a disc brake assembly and separated from engagement therewith by a normal brake running clearance when the disc brake assembly is not actuated. When the disc brake assembly is actuated, the brake pads take up the clearance and engage the brake surfaces of the brake disc.

In order to provide the normal brake running clearance, the brake disc must be manufactured to close tolerances with the brake surfaces oriented in a perpendicularly relationship relative to the axis of the brake disc and in parallel relationship relative to one another. A method of machining to close tolerances on a brake disc which is mounted through a bearing on a fixed stub shaft is disclosed in U.S. Pat. No. 5,430,926, to Dean J. Hartford. Normally, however, in a front drive or driven wheel a bearing assembly is disposed about the vehicle hub, rather than in the vehicle hub as in the aforementioned patent, and after the brake surfaces have been machined. As the assembly is mounted to the vehicle, the bearing assembly is loaded to finalize the relationship or orientation between the brake surfaces and the axis of rotation and can result in misalignment of the brake surfaces.

SUMMARY OF THE INVENTION

This invention relates to method for fabricating a vehicle hub, bearing and brake disc assembly wherein the brake surface of the brake disc is oriented in a predetermined relationship relative to the outer race of the bearing assembly. The method comprises the steps of: (a) providing a vehicle hub including a hub flange; (b) providing a bearing assembly having an outer race; (c) installing the bearing assembly about the vehicle hub; (d) providing a separately formed brake disc having a brake surface; (e) securing the brake disc to the hub flange of the vehicle hub to produce a vehicle hub, bearing and brake disc assembly; (f) supporting the vehicle hub, bearing and brake disc assembly on a machining apparatus; and (g) using the machining apparatus to machine the brake surface of the brake disc of the vehicle hub, bearing and brake disc assembly whereby the brake surface is oriented in a predetermined relationship relative to the outer race of the bearing assembly. As a result of producing the vehicle hub, bearing and brake disc assembly in this manner, tighter tolerances are maintained in the brake surfaces of the brake disc.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
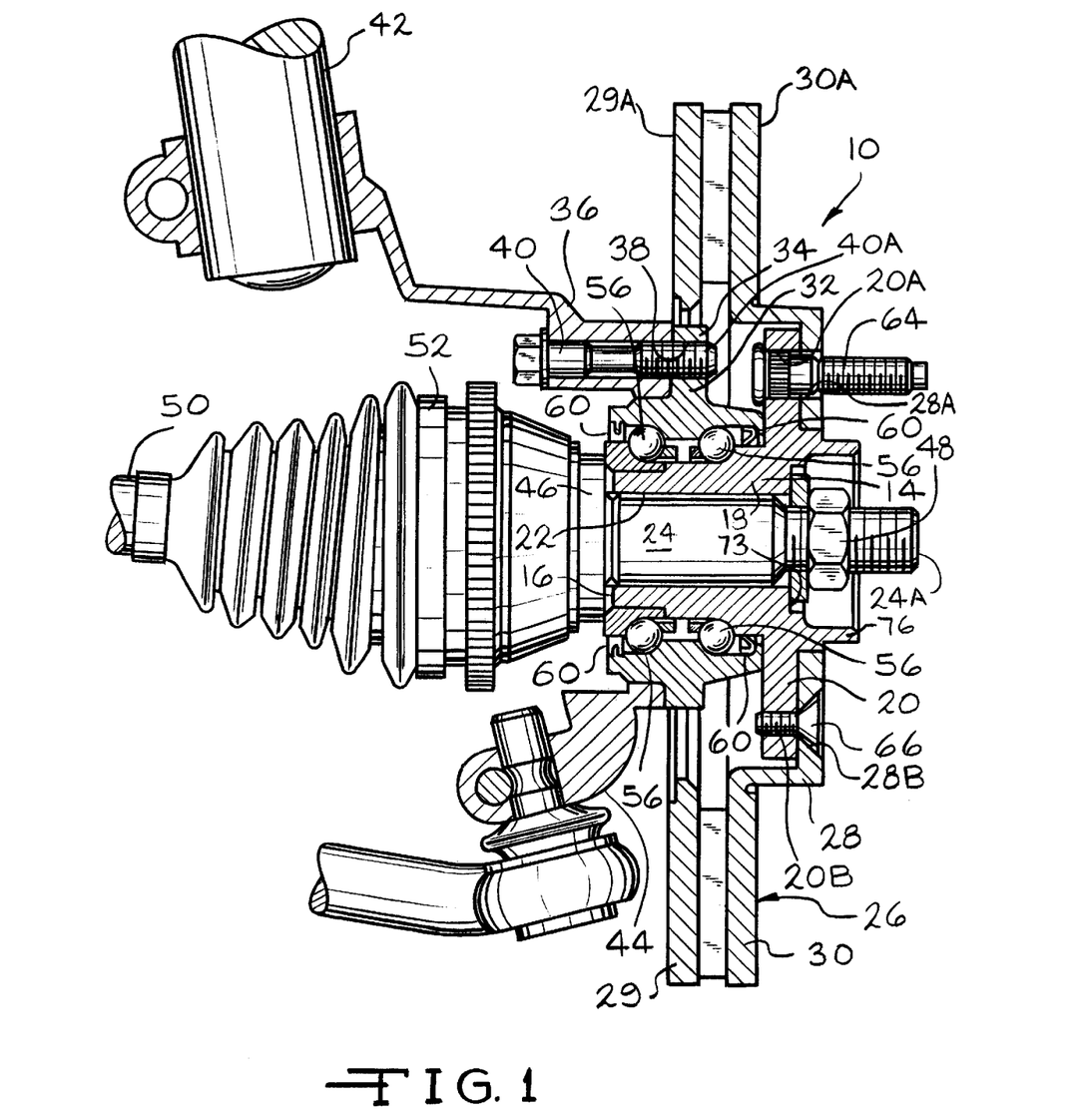
FIG. 1 is a cross sectional view of portion of a vehicle having a vehicle hub, bearing and brake disc assembly produced according to the method of the present invention installed thereon.

Referring to the drawings, wherein like numerals indicate like or corresponding parts throughout the several views, a vehicle hub, bearing and brake disc assembly produced in accordance with the subject invention is generally shown at 10 in FIG. 1. The vehicle hub, bearing and brake disc assembly 10 includes a vehicle hub and bearing subassembly, generally shown at 12, and a brake disc or rotor 26. The vehicle hub and bearing subassembly 12 includes a vehicle hub 14 and a bearing assembly 15. The vehicle hub 14 extends between a drive end 16 and a wheel end 18 thereof. The vehicle hub 14 is provided with a radially outwardly extending hub flange 20 and a bore 22 extending between the drive end 16 and the wheel end 18 for receiving a drive shaft 24.

The illustrated brake disc 26 is ventilated and includes a mounting flange 28 and a pair of opposed friction plates 29 and 30 which are spaced apart from one another by a plurality of intermediate ribs or posts (not shown) in a known manner. The friction plates 29 and 30 define a pair of opposed generally parallel brake surfaces 29A and 30B. Alternatively, the brake disc 26 can be of other constructions if so desired.

Figure 2:
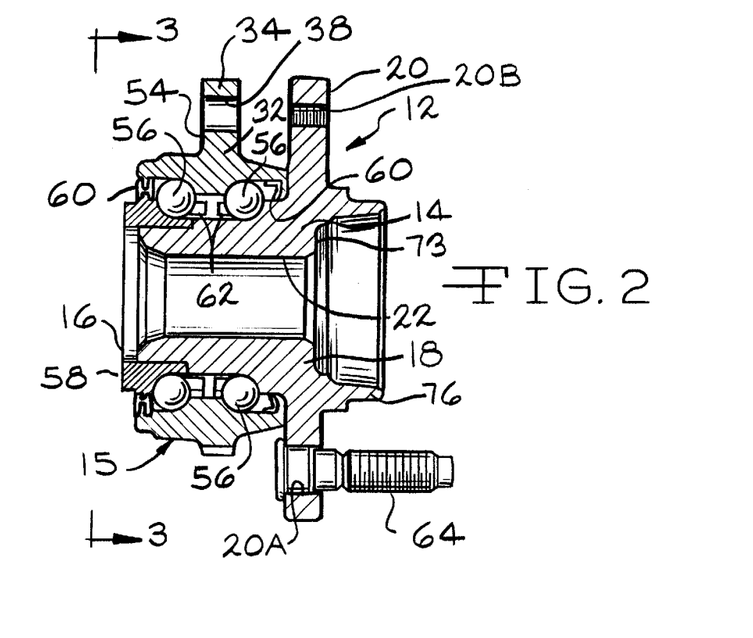
FIG. 2 is a cross sectional view of a portion of the vehicle hub, bearing and brake disc assembly illustrated in FIG. 1.
Figure 3:
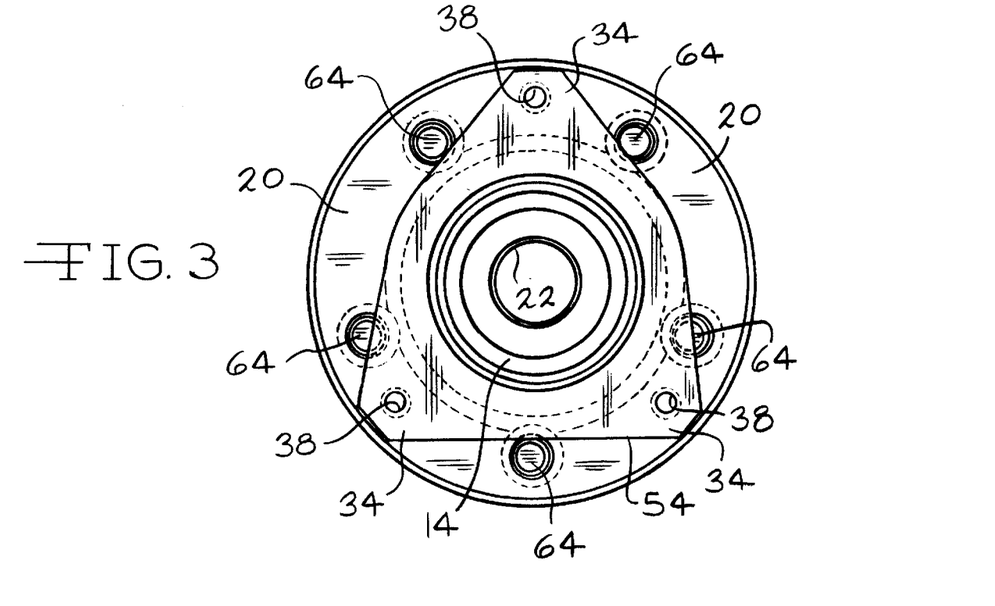
FIG. 3 is a view taken along line 3—3 of FIG. 2.

The bearing assembly 15 surrounds the vehicle hub 14 between the drive end 16 and the hub flange 20 for supporting the vehicle hub 14. To support the vehicle hub 14, the bearing assembly 15 includes an outer race 32 presenting a bearing flange 34 for attachment to a support structure, such as a steering knuckle 36. In the illustrated embodiment, the bearing flange 34 is generally triangular in peripheral configuration, as shown FIG. 2. The bearing flange 34 includes a plurality of threaded holes 38 at the apexes for receiving bolts 40 which, in turn, extend through holes provided in the knuckle 36. The bolts 40 have threaded ends 40A which are received in threaded holes 38 to secure the bearing assembly 15 to the knuckle 36. The knuckle 36 is rotatably supported by a strut 42 in a known manner. A ball joint 44 connects the knuckle 36 to the car structure (not shown). A drive shaft 24 is provided and includes a head 46 in engagement with the bearing assembly 15. A nut/washer 48 is installed on a threaded end 24A of the drive shaft 24 in order to place the drive shaft 24 in tension, load the bearing assembly 15, and rotate the vehicle hub 14 which drives a vehicle wheel (not shown). The driving force is delivered through a drive axle 50 and a universal coupling, i.e., a constant velocity joint, 52, all of which is well known in the art.

Figure 4:
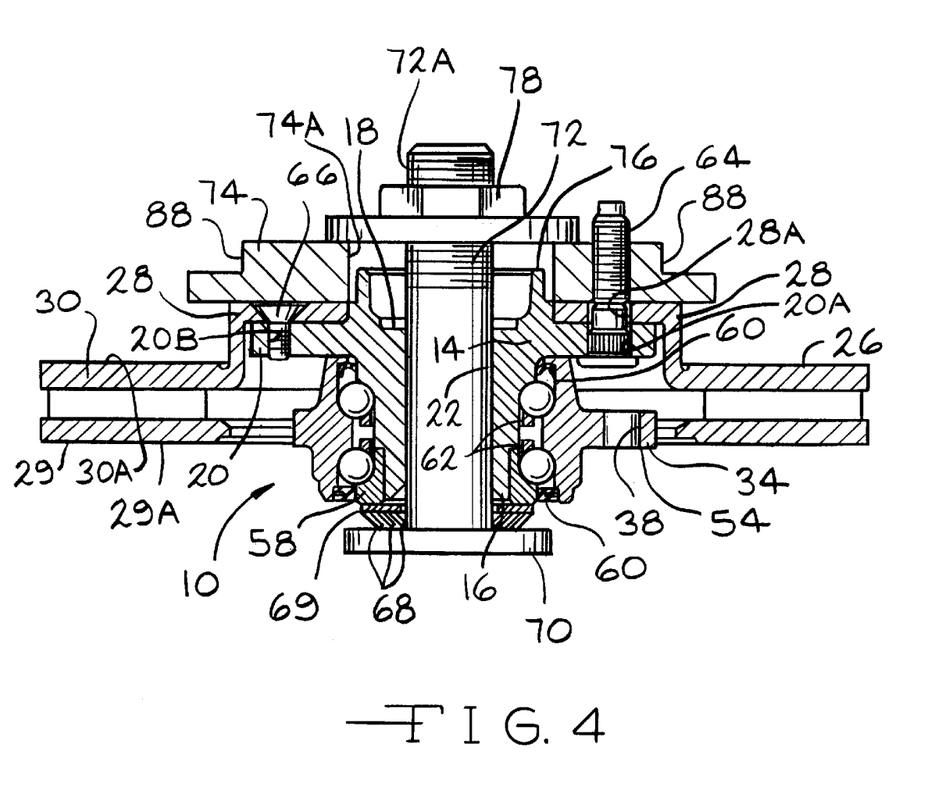
FIG. 4 is a cross sectional view of the vehicle hub, bearing and brake disc assembly illustrated in FIG. 1, showing the vehicle hub, bearing and brake disc assembly attached to a first embodiment of a clamping fixture used to produce the vehicle hub, bearing and brake disc assembly in accordance with a first method of this invention.
Figure 5:
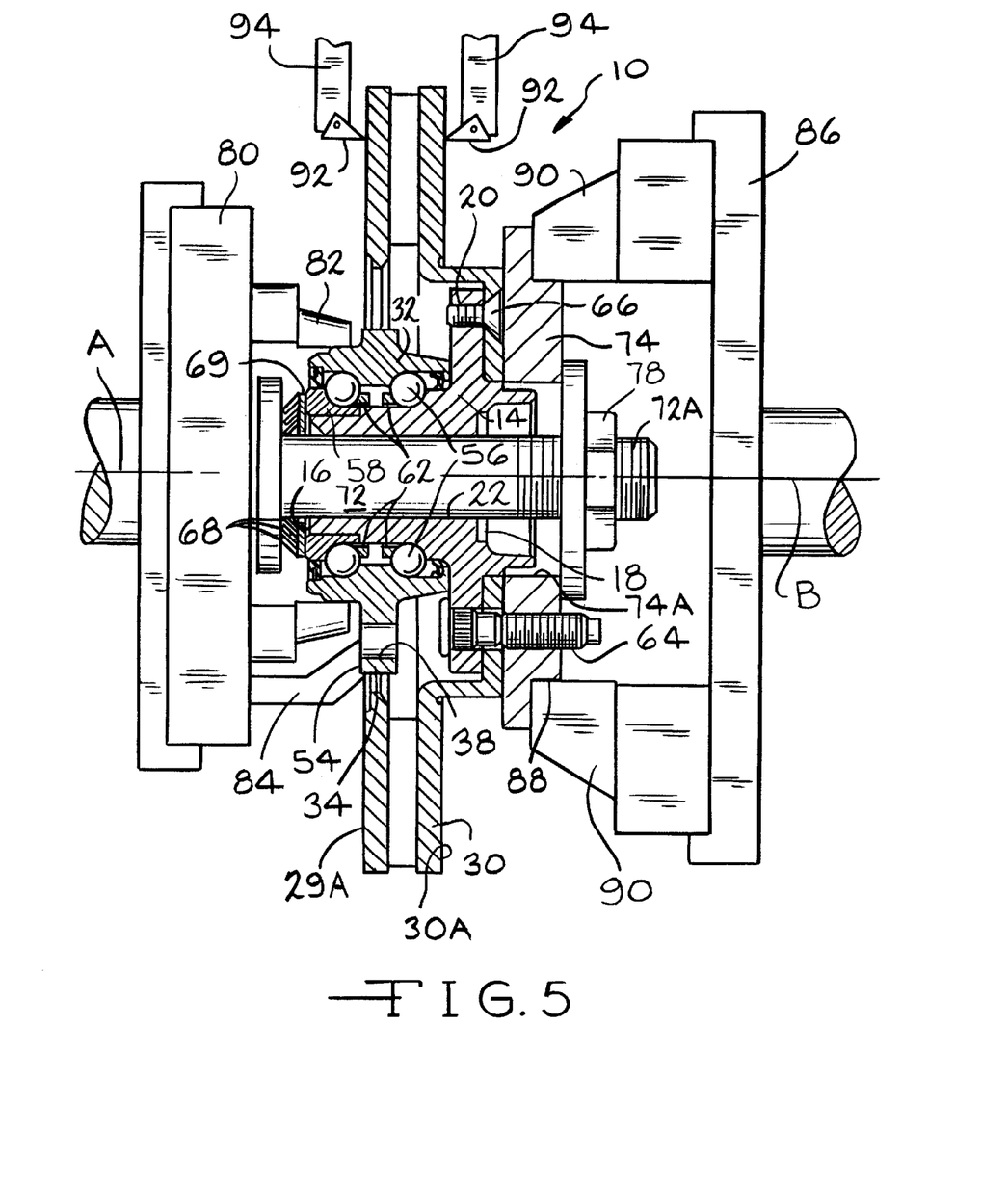
FIG. 5 is a cross sectional view of the vehicle hub, bearing and brake disc assembly illustrated in FIG. 4 disposed in a first embodiment of a machine for machining the brake surfaces of the brake disc in accordance with this invention.

Turning now to FIGS. 4–5, a first method for fabricating a vehicle hub, bearing and brake disc assembly 10 in accordance with this invention will now be discussed. The first method comprises various steps which may be performed in numerous different sequences.

The first step is the machining of a radially extending gage surface 54 on the bearing flange 34 of the outer race 32 of the bearing assembly 15. This is followed by disposing roller elements 56 and the outer race 32 of the bearing assembly 15 around the vehicle hub 14 with the gage surface 54 facing the drive end 16 of the vehicle hub 14. A race lock member 58 is secured to the vehicle hub 14 by a press fit to retain the bearing assembly 15 on the vehicle hub 14 under a predetermined pre-load. At the same time, seals 60 are positioned between each end of the bearing assembly 15, the vehicle hub 14, and the race lock member 58. Separators or cages 62 are also disposed between the roller elements 56.

A plurality of threaded wheel studs 64 are secured to the hub flange 20 to extend axially therefrom toward the wheel end 18 of the vehicle hub 14, the studs 64 being press fit in non-threaded holes 20A provided in the hub flange 20. As will be discussed below, the threaded ends of the studs 64 extend through openings provided in the brake disc 26 and holes provided in a vehicle wheel (not shown), as is well known in the art.

The next step is the attaching of the brake disc 26 to the vehicle hub and bearing subassembly 12, with the wheel studs 64 extending through holes 28A provided in the mounting flange 28 of the brake disc 26. The mounting flange 28 of the brake disc 26 is secured to the vehicle hub and bearing subassembly 12 by screws 66. In the illustrated embodiment, the screws 66 extend through non-threaded countersunk openings 28B provided in the mounting flange 28 of the brake disc 26. The threaded ends 66A of the screws 66 are received in the threaded openings 20B provided in the hub flange 20 to secure the brake disc 26 to the vehicle hub and bearing subassembly 12. Alternatively, other means can be used to secure the brake disc 26 to the vehicle hub and bearing subassembly 12 if so desired.

A spring washer 68 is disposed on a head 70 of a fixture post 72, the fixture post 72 being supported vertically for receiving the vehicle hub 14. The spring washer 68 is illustrated as a plurality of Belleville washers but may comprise an elastomeric, or the like. A washer 69 is disposed between the Belleville washers 68 and the race lock member 58. The vehicle hub 14 is placed on the fixture post 72 with the spring washer 68 in engagement with the race lock member 58 as the fixture post 72 is inserted through the spring washer 68, the washer 69, and through the bore 22 to extend from the wheel end 18 of the vehicle hub 14. Preferably, the fixture post 72 snugly engages the interior of the bore 22 of the vehicle hub 14 in a press fit therewith.

While in the vertical position, a clamp plate 74 is disposed about the wheel end 18 of the vehicle hub 14 and in engagement with the mounting flange 28 of the brake disc 26. The clamp plate 74 has a central opening 74A surrounding a projection 76 at the wheel end 18. A washer/nut 78 is disposed over the clamp plate 74 and in threaded engagement with a threaded end 72A of the post 72 to place the post 72 in tension to urge the spring washer 68 against the bearing lock member 58 and the clamp plate 74 against the mounting flange 28 of the brake disc 26. This maintains the pre-load on and retains the bearing assembly 15 to the vehicle hub 14; this prevents the race lock member 58 from changing position to maintain the pre-loading the same as occurs when the assembly is mounted on the vehicle, as shown in FIG. 1. This also provides a clamp load between the brake disc 26 and the hub face.

This subassembly is then moved to a machining station, as shown in FIG. 5, and placed in position to be clamped or grasped by a cam chuck 80 mounted on a stationary machine. The cam chuck 80 has jaws 82 which clamp the outer race 32 of the bearing assembly 15 and draws the gage surface 54 against a gage 84 to properly orient the outer race 32 about a fixed axis A. The gage 84 is shown as engaging only one area of the circumference of the gaging surface 54; however, the gage 84 engages most of the circumference of the gaging surface 54 and includes air sensors (not shown) to confirm that the gaging surface 54 is property oriented and engaging the gage 84 in all quadrants.

Once the outer race 32 is clamped in a fixed position relative to the fixed axis A, the next step is engaging the clamp plate 74 with a rotating member 86 to rotate the clamp plate 74 about a floating axis B. More specifically, the clamp plate 74 presents a step or shoulder 88 and the rotating member 86 is a power chuck with rotating jaws 90. The rotating jaws 90 rotate about the axis B which is floating, i.e., not fixed, to allow some relative radial movement between the outer race 32 and the vehicle hub 14 or the brake disc 26. As a result, the rotating member 86 is operative to drive and rotate the clamp plate 74 and therefore, the vehicle hub 14 and the brake disc 26.

The final step is the machining of the brake surfaces 29A and 30A of the friction plates 29 and 30, respectively, of the brake disc 26 while rotating the vehicle hub 14 and the brake disc 26 relative to the outer race 32. This machining is accomplished with cutting inserts 92 which are supported on shafts 94 disposed on opposite sides of the friction plates 29 and 30 of the brake disc 26. Thus, the brake surfaces 29A and 30A are machined in a predetermined relationship relative to the outer race 32. Subsequently, the fixture post 72 is removed and the completed vehicle hub, bearing and brake disc assembly 10 is installed onto the knuckle 36, as shown in FIG. 1.

Figure 6:
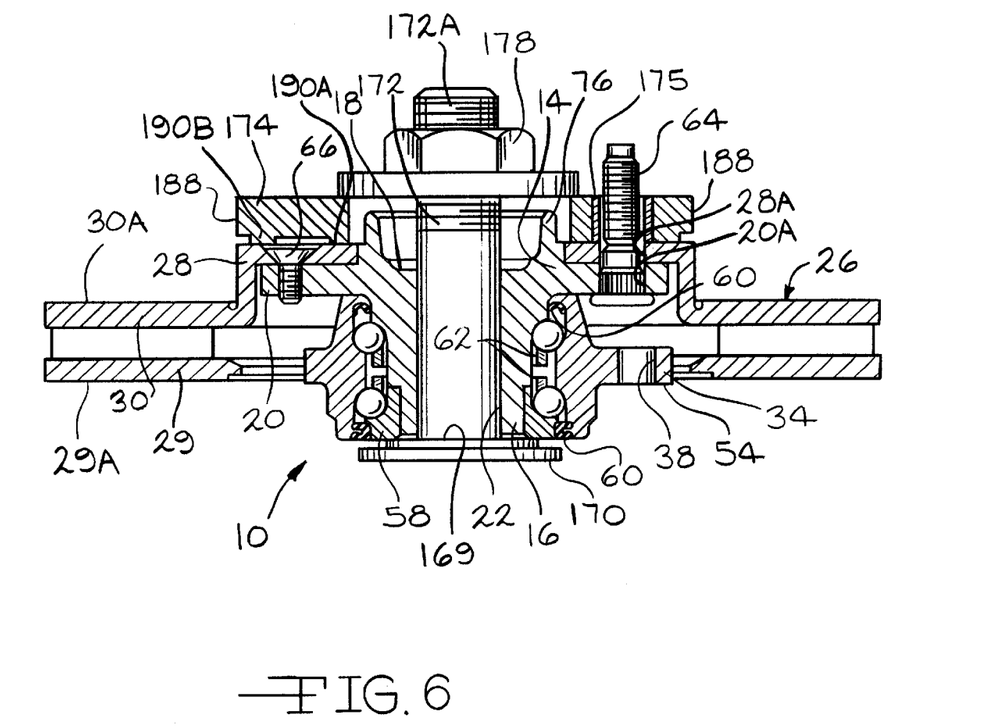
FIG. 6 is a cross sectional view of the vehicle hub, bearing and brake disc assembly illustrated in FIG. 1, showing the vehicle hub, bearing and brake disc assembly attached to a second embodiment of a clamping fixture used to produce the vehicle hub, bearing and brake disc assembly in accordance with a second method of this invention.
Figure 7:
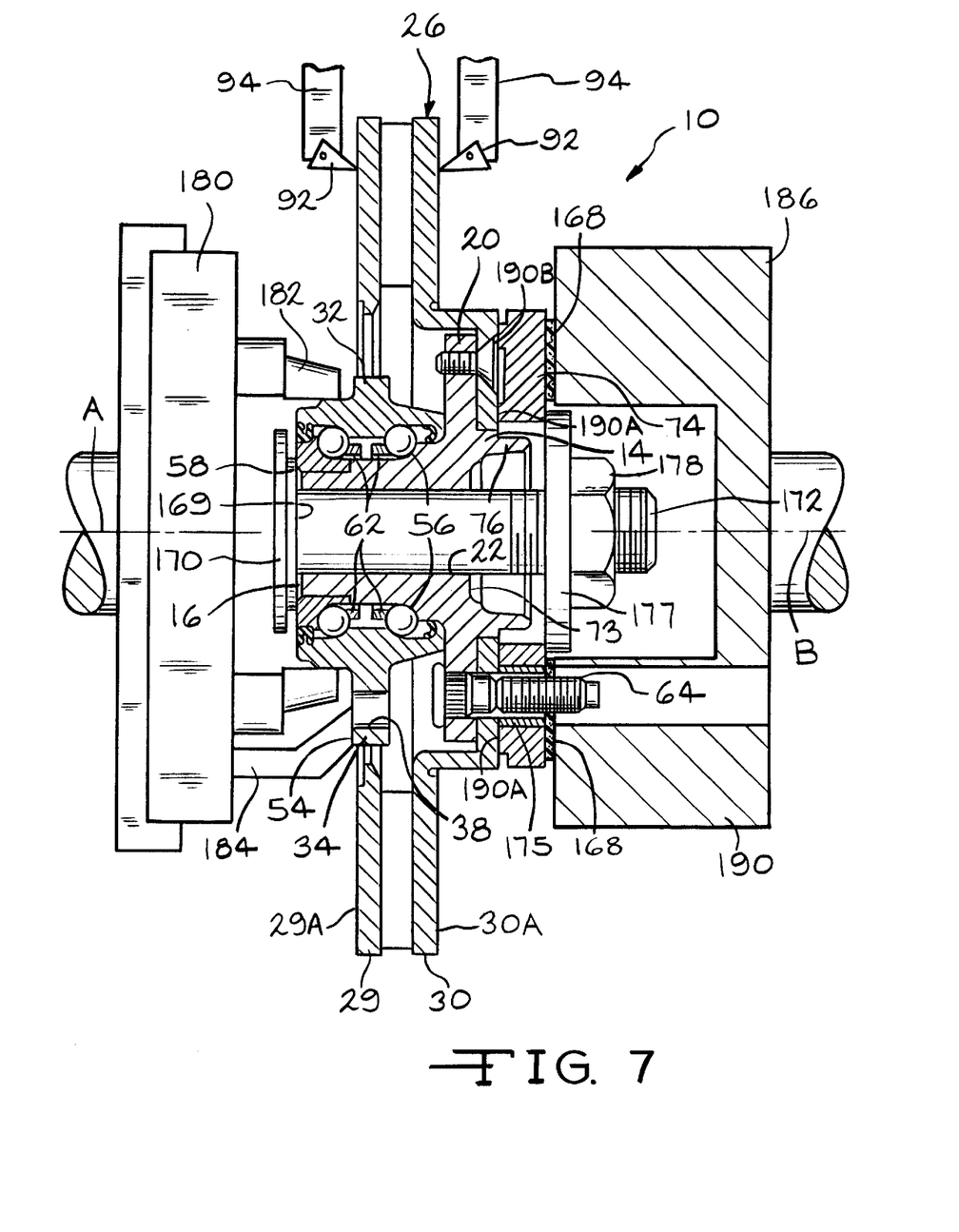
FIG. 7 is a cross sectional view of the vehicle hub, bearing and brake disc assembly illustrated in FIG. 6 disposed in a second embodiment of a machine for machining the brake surfaces of the brake disc in accordance with this invention.
Figure 8:
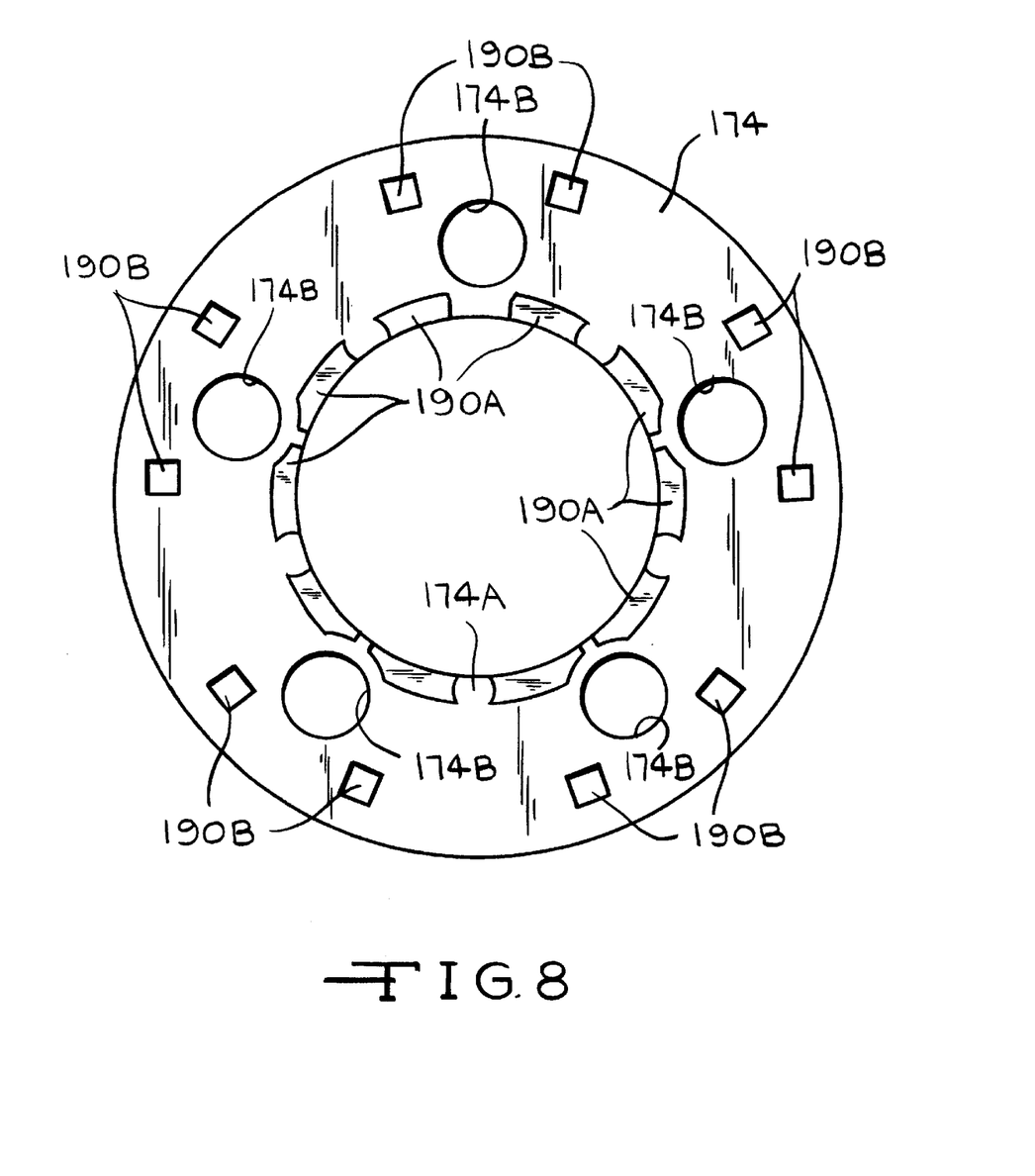
FIG. 8 is a cross sectional view of a pressure plate illustrated in FIGS. 6 and 7.

Turning now to FIGS. 6–8, a second method for fabricating a vehicle hub, bearing and brake disc assembly 10 in accordance with this invention will now be discussed. The second method comprises various steps which may be performed in numerous different sequences.

The first step is the machining of a radially extending gage surface 54 on the bearing flange 34 of the outer race 32 of the bearing assembly 15. This is followed by disposing roller elements 56 and the outer race 32 of the bearing assembly 15 around the vehicle hub 14 with the gage surface 54 facing the drive end 16 of the vehicle hub 14. A race lock member 58 is secured to the vehicle hub 14 by a press fit to retain the bearing assembly 15 on the vehicle hub 14 under a predetermined pre-load. At the same time, seals 60 are positioned between each end of the bearing assembly 15, the vehicle hub 14, and the race lock member 58. Separators or cages 62 are also disposed between the roller elements 56.

A plurality of threaded wheel studs 64 are secured to the hub flange 20 to extend axially therefrom toward the wheel end 18 of the vehicle hub 14, the studs 64 being press fit in non-threaded holes 20A provided in the hub flange 20. As will be discussed below, the threaded ends of the studs 64 extend through openings provided in the brake disc 26 and holes provided in a vehicle wheel (not shown), as is well known in the art.

The next step is the attaching of the brake disc 26 to the vehicle hub and bearing subassembly 12, with the wheel studs 64 extending through holes 28A provided in the mounting flange 28 of the brake disc 26. The mounting flange 28 of the brake disc 26 is secured to the vehicle hub and bearing subassembly 12 by screws 66. In the illustrated embodiment, the screws 66 extend through non-threaded countersunk openings 28B provided in the mounting flange 28 of the brake disc 26. The threaded ends 66A of the screws 66 are received in the threaded openings 20B provided in the hub flange 20 to secure the brake disc 26 to the vehicle hub and bearing subassembly 12. Alternatively, other means can be used to secure the brake disc 26 to the vehicle hub and bearing subassembly 12 if so desired.

The head 170 of a fixture post 172 has an annular shoulder 169 for engaging the race lock member 58. The fixture post 172 is supported vertically for receiving the vehicle hub 14. The vehicle hub 14 is placed on the fixture post 172 with the head 170 thereof in engagement with the race lock member 58 as the post 172 is inserted through the hub bore 22 to extend from the wheel end 18 of the vehicle hub 14. Preferably, the fixture post 172 snugly engages the interior of the bore 22 of the vehicle hub 14 in a press fit therewith.

While in the vertical position, a pressure plate 174 is disposed about the wheel end 18 of the vehicle hub 14 and in engagement with the mounting flange 28 of the brake disc 26. The pressure plate 174 has a central opening 174A surrounding a projection 176 at the wheel end 18 of the wheel hub 14. A plurality of bushings 175 are press fit into openings 174B provided in the pressure plate 174 and surround, in spaced relationship, each of the studs 64. The bushings 175 are preferably constructed of brass, which is softer than the studs 64, to prevent damage to the threads of the studs 64.

The pressure plate 174 further includes a plurality of circumferentially spaced tabs 190A and 190B provided thereon. The tabs 190A are spaced radially inwardly relative to the holes 174B, and the tabs 190B are spaced radially outwardly relative to the holes 174B. The inner tabs 190A and outer tabs 190B engage the mounting flange 28 of the brake disc 26 for simulating the pressure points exerted by a vehicle wheel. In this fashion, the brake disc 26 is machined under conditions which are as near the running conditions of the brake disc 26 when mounted on a vehicle with a vehicle wheel attached.

A washer 177 and nut 178 are disposed over the pressure plate 174 with the nut 178 in threaded engagement with the post 172 to place the post 172 in tension between the race lock member 58 and the pressure plate 174 to urge the tabs 190A and 190B into engagement with the mounting flange 28 of the brake disc 26 for simulating the pressure points exerted by a vehicle wheel. This maintains the pre-load on and retains the bearing assembly 15 to the vehicle hub 14, and prevents the race lock member 58 from changing position to maintain the pre-loading the same as occurs when the assembly 10 is mounted on the vehicle as shown in FIG. 1. This also provides a clamp load between the brake disc 26 and the hub face.

The subassembly is then moved to a machining station, as shown in FIG. 6, and placed in position to be clamped or grasped by a cam chuck 180 mounted on a stationary machine. The cam chuck 180 has jaws 182 which are operative to clamp the outer race 32 of the bearing assembly 15 and draw the gage surface 54 against a gage 84 in order to properly orient the outer race 32 about a fixed axis A. The gage 84 is shown as engaging only one area of the circumference of the gaging surface 54; however, the gage 84 is operative to engage most of the circumference of the gaging surface 54 and includes air sensors (not shown) to confirm that the gaging surface 54 is properly oriented and engaging the gage 84 in all quadrants.

Once the outer race 32 is clamped in a fixed position relative to the fixed axis A, the next step is engaging the pressure plate 174 with a rotating member 186 to thereby rotate the pressure plate 174 about a floating axis B. More specifically, a resilient pad 168 is sandwiched between the pressure plate 174 and the rotating member 186 in a plane generally perpendicular to the floating axis B and urges the rotating member 186 against the pressure plate 174 to compress the resilient pad 168 between the rotating member 186 and the pressure plate 174. Accordingly, the rotating member 186 rotates about the axis B which is floating, i.e., not fixed, to allow some relative radial movement between the outer race 32 and the vehicle hub 14 or the brake disc 26. The resilient pad 168 allows relative radial movement between the rotating member 186 and the pressure place 174 as the rotating member 186 is urged or forced axially into engagement with the resilient pad 168. As a result, pressure plate 174, and therefore the vehicle hub 14 and disc brake 26, are frictionally driven and rotated by the rotating member 186.

The final step is the machining of the brake surfaces 29A and 30A of the brake disc 26 while rotating the vehicle hub 14 and brake disc 26 relative to the outer race 32 of the bearing assembly 15. This machining is accomplished with cutting inserts 92 which are supported on shafts 94 disposed on opposite sides of the friction plates 29 and 30 of the brake disc 26. Thus, the brake surfaces 29A and 30A are machined in a predetermined relationship relative to the outer race 32. Subsequently, the fixture post 72 is removed and the completed vehicle hub, bearing and brake disc assembly 10 is installed onto the knuckle 36, as shown in FIG. 1.

Turning now to FIGS. 9–12, a third method for fabricating a vehicle hub, bearing and brake disc assembly 10 in accordance with this invention will now be discussed. The third method comprises various steps which may be performed in numerous different sequences.

Figure 9:
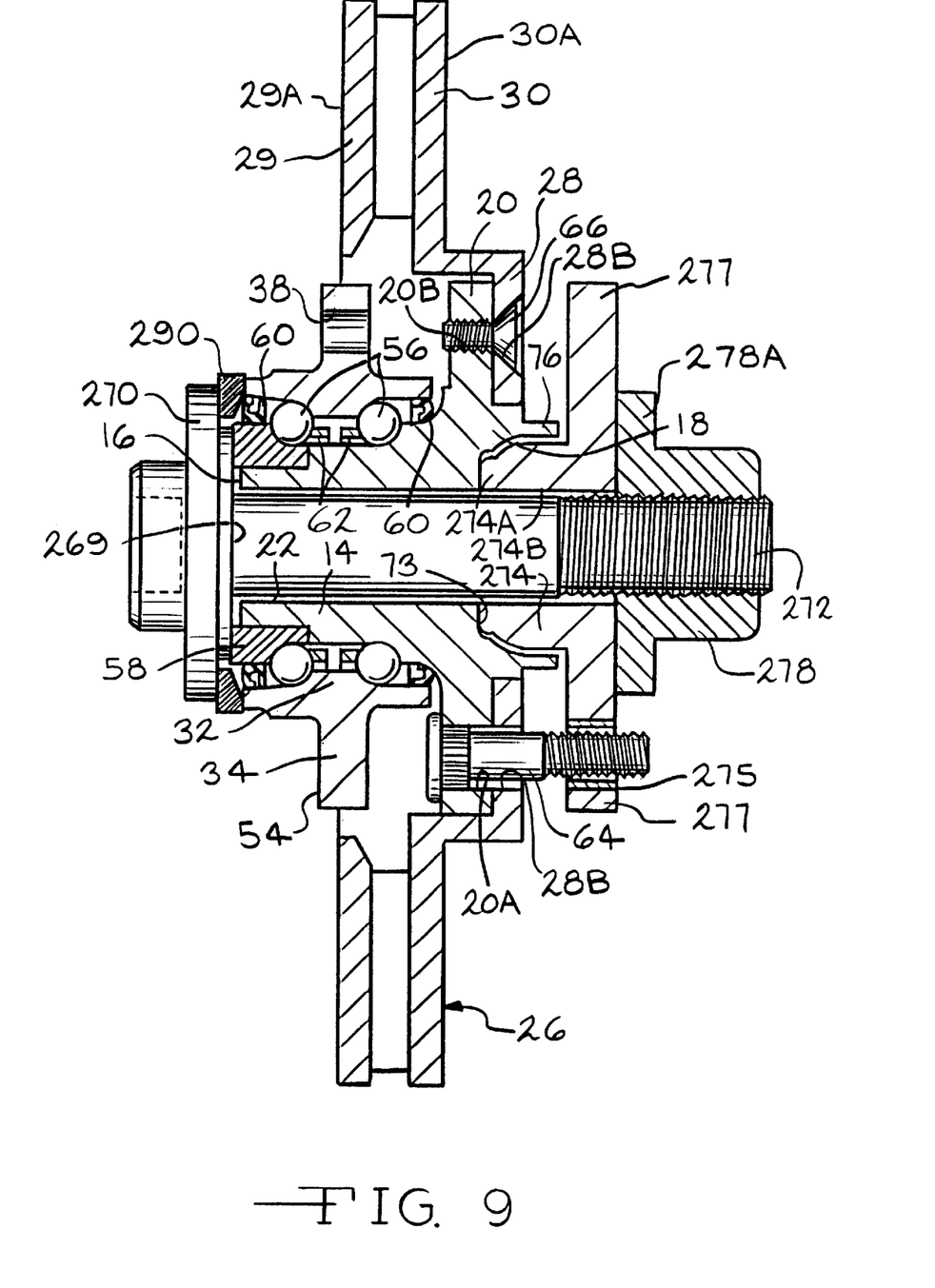
FIG. 9 is a cross sectional view of the vehicle hub, bearing and brake disc assembly illustrated in FIG. 1, showing the vehicle hub, bearing and brake disc assembly attached to a third embodiment of a clamping fixture used to produce the vehicle hub, bearing and brake disc assembly in accordance with a third method of this invention.

The first step is the machining of a radially extending gage surface 54 on the bearing flange 34 of the outer race 32 of the bearing assembly 15. This is followed by disposing roller elements 56 and the outer race 32 of the bearing assembly 15 around the vehicle hub 14 with the gage surface 54 facing the drive end 16 of the vehicle hub 14. A race lock member 58 is secured to the vehicle hub 14 by a press fit to retain the bearing assembly 15 on the vehicle hub 14 under a predetermined pre-load. At the same time, seals 60 are positioned between each end of the bearing assembly 15, the vehicle hub 14, and the race lock member 58. Separators or cages 62 are also disposed between the roller elements 56.

A plurality of threaded wheel studs 64 are secured to the hub flange 20 to extend axially therefrom toward the wheel end 18 of the vehicle hub 14, the studs 64 being press fit in non-threaded holes 20A provided in the hub flange 20. As will be discussed below, the threaded ends of the studs 64 extend through openings provided in the brake disc 26 and holes provided in a vehicle wheel (not shown), as well known in the art.

The next step is the attaching of the brake disc 26 to the vehicle hub and bearing subassembly 12, with the wheel studs 64 extending through holes 28A provided in the mounting flange 28 of the brake disc 26. The mounting flange 28 of the brake disc 26 is secured to the vehicle hub and bearing subassembly 12 by screws 66. In the illustrated embodiment, the screws 66 extend through nonthreaded countersunk openings 28B provided in the mounting flange 28 of the brake disc 26. The threaded ends 66A of the screws 66 are received in the threaded openings 20B provided in the hub flange 20 to secure the brake disc 26 to the vehicle hub and bearing subassembly 12. Alternatively, other means can be used to secure the brake disc 26 to the vehicle hub and bearing subassembly 12 if so desired.

The head 270 of a fixture post 272 has an annular shoulder 269 for engaging the race lock member 58. The fixture post 272 is supported vertically for receiving the vehicle hub 14. The vehicle hub 14 is placed on the post 272 with the head 270 of the fixture post 272 in engagement with the race lock member 58 as the post 272 is inserted through the bore 22 to extend from the wheel end 18 of the vehicle hub 14. Preferably, the post 272 extends through the bore 22 of the hub 14 in a clearance fit therewith.

While in the vertical position, a pressure plate 274 having a central opening 274B is disposed about wheel end 18 and in engagement with the vehicle hub 14. More specifically, a pocket 73 is formed in the wheel end 18 of the vehicle hub 14 which is surrounded by a projection 76 extending from the wheel end 18. The pocket 73 is radially within the circumference of the vehicle hub 14 as defined by that circumference of the vehicle hub 14 upon which the roller elements 56 are in rolling engagement. The pressure plate 274 comprises a nose 274A which is disposed radially within the pocket 73 and engages the vehicle hub 14 within its outer circumference.

At least one spoke, a circular disc 277 as illustrated, extends radially from the pressure plate 274 and in an axially spaced relationship to the mounting flange 28 of the brake disc 26 and in a circumferential driving relationship with the studs 64. It is important that the pressure plate 274 exert no axial forces on the hub flange 20 to prevent a moment on the bearing assembly 15 which would not exist when in the installed condition of FIG. 1. A plurality of bushings 275 are press fit into the spoke 277 to surround, in spaced relationship, each of the studs 64. The bushings 275 are of brass or rubber, which is softer than the studs 64, to prevent damage to the threads of the studs 64.

A washer/nut 278 are disposed over the pressure plate 274 and in threaded engagement with a threaded end 272A of the post 272 to place the post 272 in tension between the race lock member 58 and the pressure plate 274 to urge the nose 274A of the pressure plate 274 into engagement with the pocket 73 of the vehicle hub 14. This maintains the pre-load on and retains the bearing assembly 15 to the vehicle hub 14; this prevents the race lock member 58 from changing position to maintain the pre-loading the same as occurs when the assembly is mounted on the vehicle as shown in FIG. 1.

Figure 10:
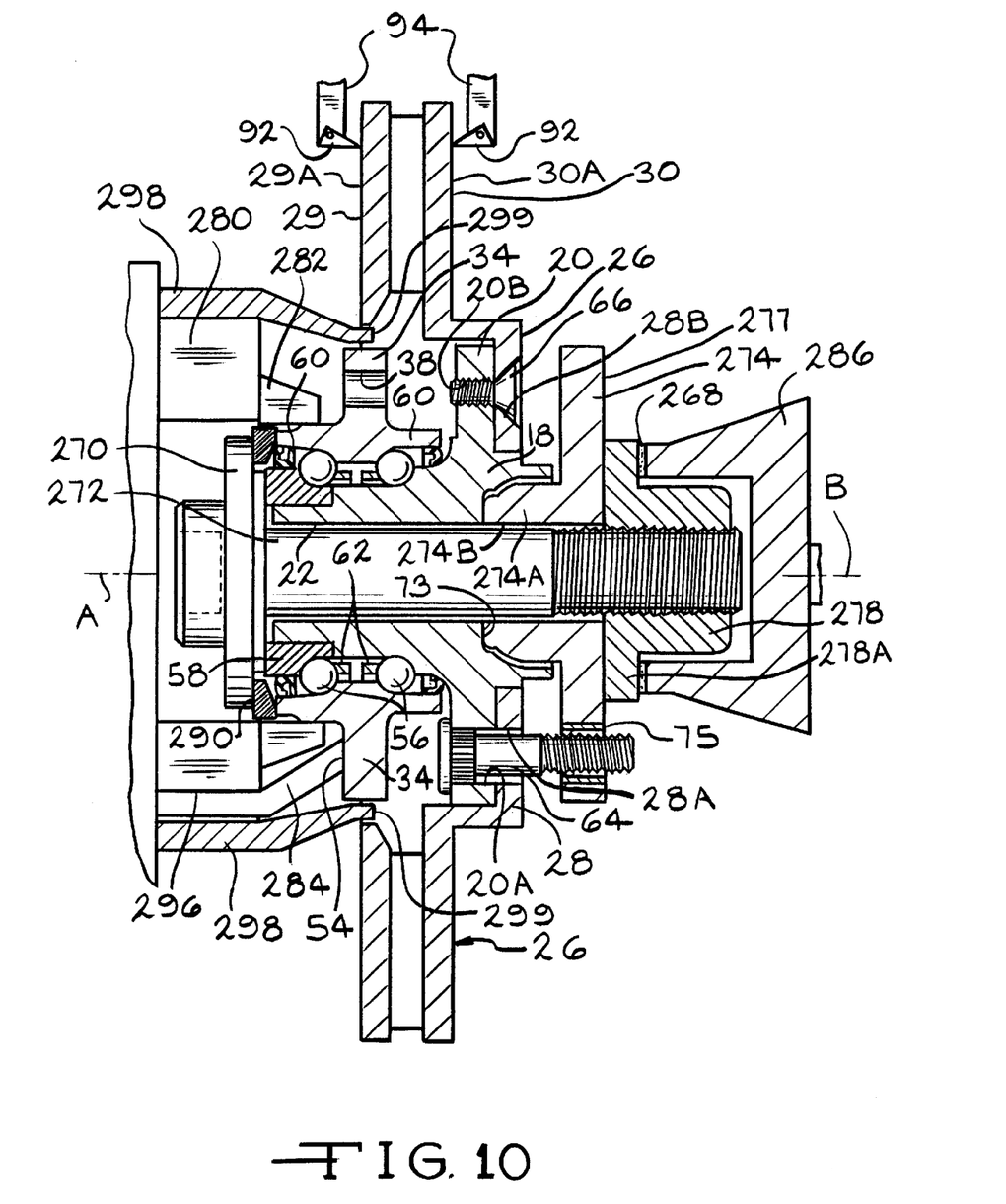
FIG. 10 is a cross sectional view of the vehicle hub, bearing and brake disc assembly illustrated in FIG. 9 disposed in a third embodiment of a machine for machining the brake surfaces of the brake disc in accordance with this invention.
Figure 11:
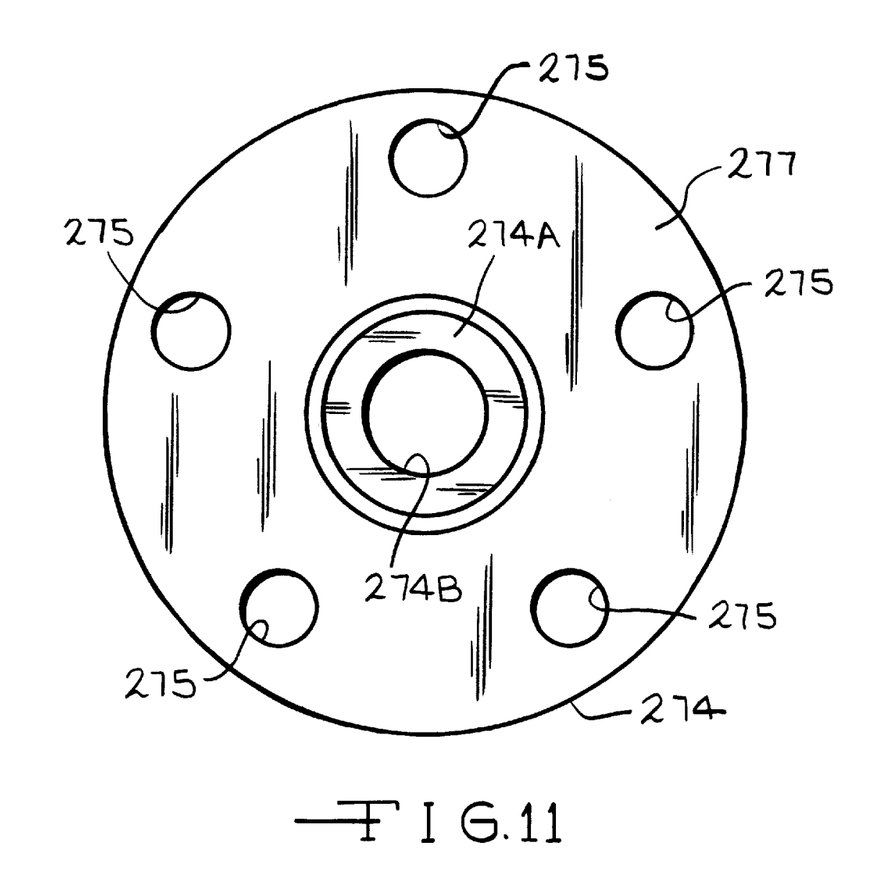
FIG. 11 is a plan view of a pressure plate illustrated in FIGS. 9 and 10.
Figure 12:
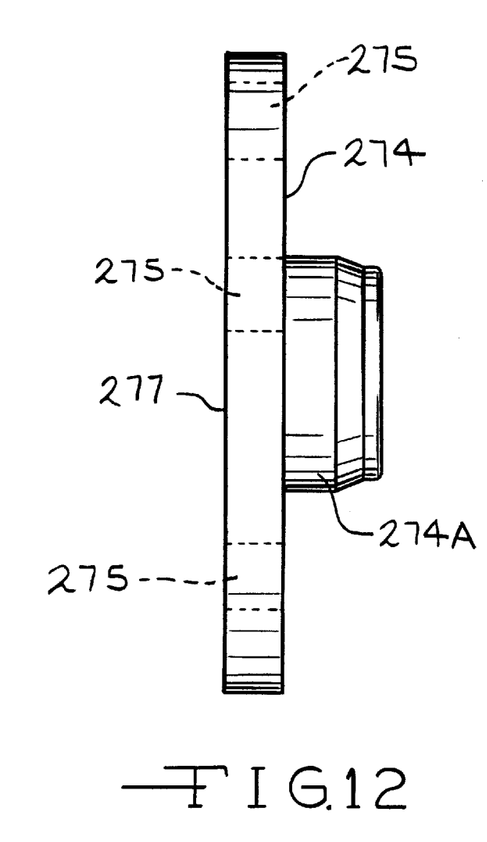
FIG. 12 is a side view of the pressure plate illustrated in FIG. 11.

This subassembly is then moved to a machining station, as shown in FIG. 10, and placed in position to be clamped or grasped by a cam chuck 280 mounted on a stationary machine. The cam chuck 280 has jaws 282 which clamp the outer race 32 of the bearing assembly 15 and draws the gage surface 54 against a gage 284 to properly orient the outer race 32 about a fixed axis A. The gage 284 is shown as engaging only one area of the circumference of the gaging surface 54; however, the gage 284 engages most of the circumference of the gaging surface 54 and includes air sensors (not shown) to confirm that the gaging surface 54 is properly oriented and engaging the gage 284 in all quadrants.

Once the outer race 32 is clamped in a fixed position relative to the fixed axis A, the next step is engaging the washer portion 278A of the washer/nut 278 with a rotating member 286 to rotate the pressure plate 274 about a floating axis B. More specifically, a resilient pad 268 is sandwiched between the washer portion 278A of the washer/nut 278 and the rotating member 286 in a plane perpendicular to the floating axis B and urging the rotating member 286 against the washer portion 278A of the washer/nut 278 to compress the resilient pad 268 between the rotating member 286 and the washer portion 278A of the washer/nut 278. Accordingly, the rotating member 286 rotates about the axis B which is floating, i.e., not fixed, to allow some relative radial movement between the outer race 32 and the vehicle hub 14 or brake disc 26.

The resilient pad 268 allows relative radial movement between the rotating member 286 and the washer portion 278A of the washer/nut 278 as the rotating member 286 is urged or forced axially into engagement with the resilient pad 268. As a result, washer/nut 278, and therefore the pressure plate 274, the vehicle hub 14, and the brake disc 26, are frictionally driven and rotated by the rotating member 286 solely within the circumference of the vehicle hub 14 at the wheel end 18 to thereby apply axial forces resulting from the frictional engagement through the vehicle hub 14 without applying axial forces to the hub flange 20 of the vehicle hub 14 and the mounting flange 28 of the brake disc 26. This prevents axial forces from being applied to the hub flange 20 and the mounting flange 28 of the brake disc 26. Said another way, this method includes placing the washer/nut 278 in threaded engagement with the fixture post 272 and tightening the washer/nut 278 against the pressure plate 274 and engaging the washer portion 278A of the washer/nut 278 with the rotating member 286 through the pad 268.

In this embodiment, an annular seal 290 disposed between the head 270 of the fixture post 272 and the outer race 32 to prevent contaminants from entering into bearing assembly 15 during the machining of the brake disc 26, i.e., to prevent the metal removed by such machining from entering the bearing assembly 15. In addition, in this embodiment, an annular plastic ring 298 is supported annularly by the chuck 280 and extends to a taper 299 in the space between the bearing flange 34 and the inner end of the friction plate 29 of the brake disc 26 to prevent chips from the machining of the brake disc 26 from entering into the bearing assembly 15. The gage 284 extends through a hole 296 in the chuck 280.

The final step is the machining of the brake surfaces 29A and 30A of the brake disc 26 while rotating the vehicle hub 14 and brake disc 26 relative to the outer race 32 of the bearing assembly 15. This machining is accomplished with cutting inserts 92 which are supported on shafts 94 disposed on opposite sides of the friction plates 29 and 30 of the brake disc 26. Thus, the brake surfaces 29A and 30A are machined in a predetermined relationship relative to the outer race 32. Subsequently, the fixture post 272 is removed and the completed vehicle hub, bearing and brake disc assembly 10 is installed onto the knuckle 36, as shown in FIG. 1.

Figure 13:
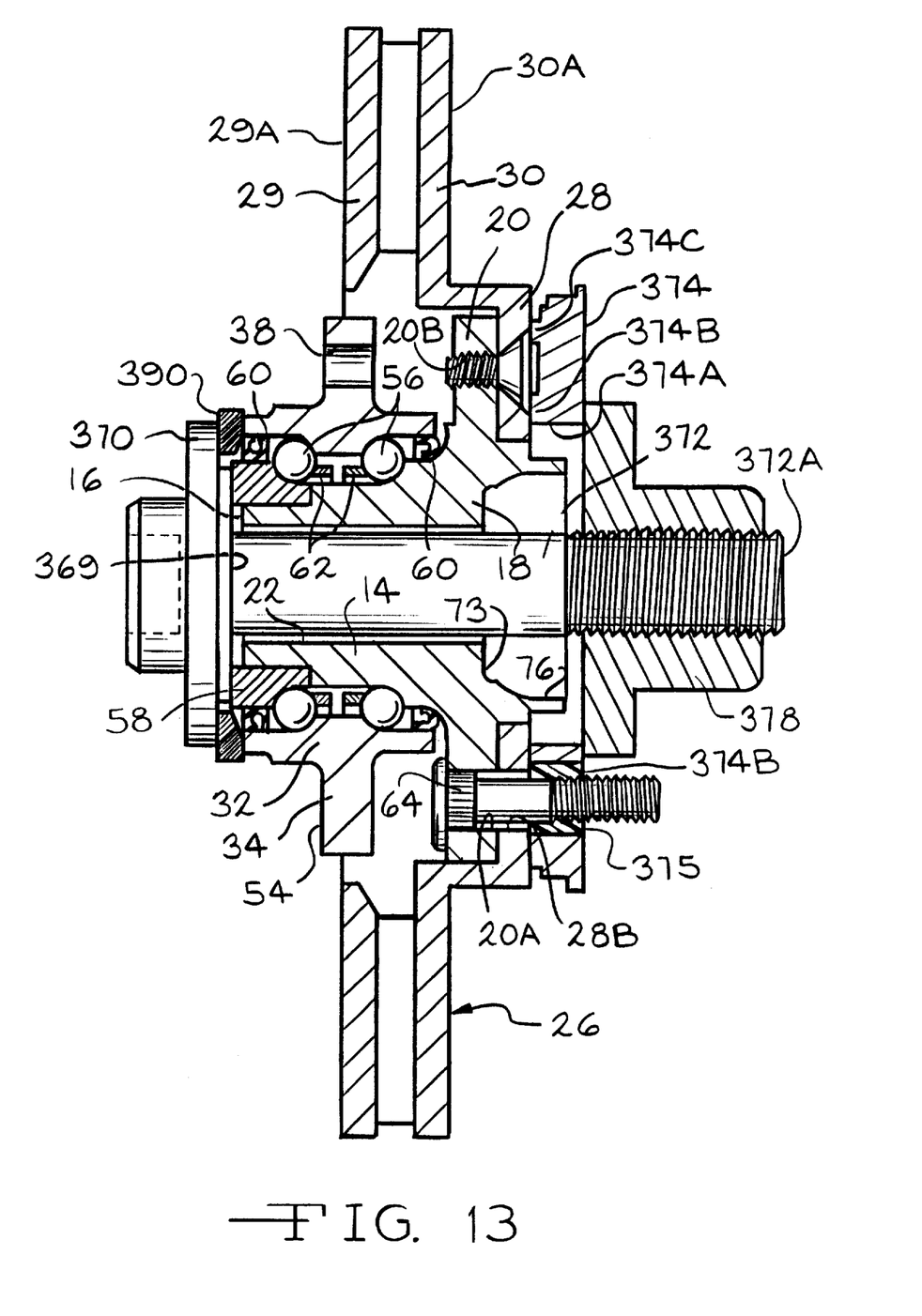
FIG. 13 is a cross sectional view of the vehicle hub, bearing and brake disc assembly illustrated in FIG. 1, showing the vehicle hub, bearing and brake disc assembly attached to a fourth embodiment of a clamping fixture used to produce the vehicle hub, bearing and brake disc assembly in accordance with a fourth method of this invention.
Figure 14:
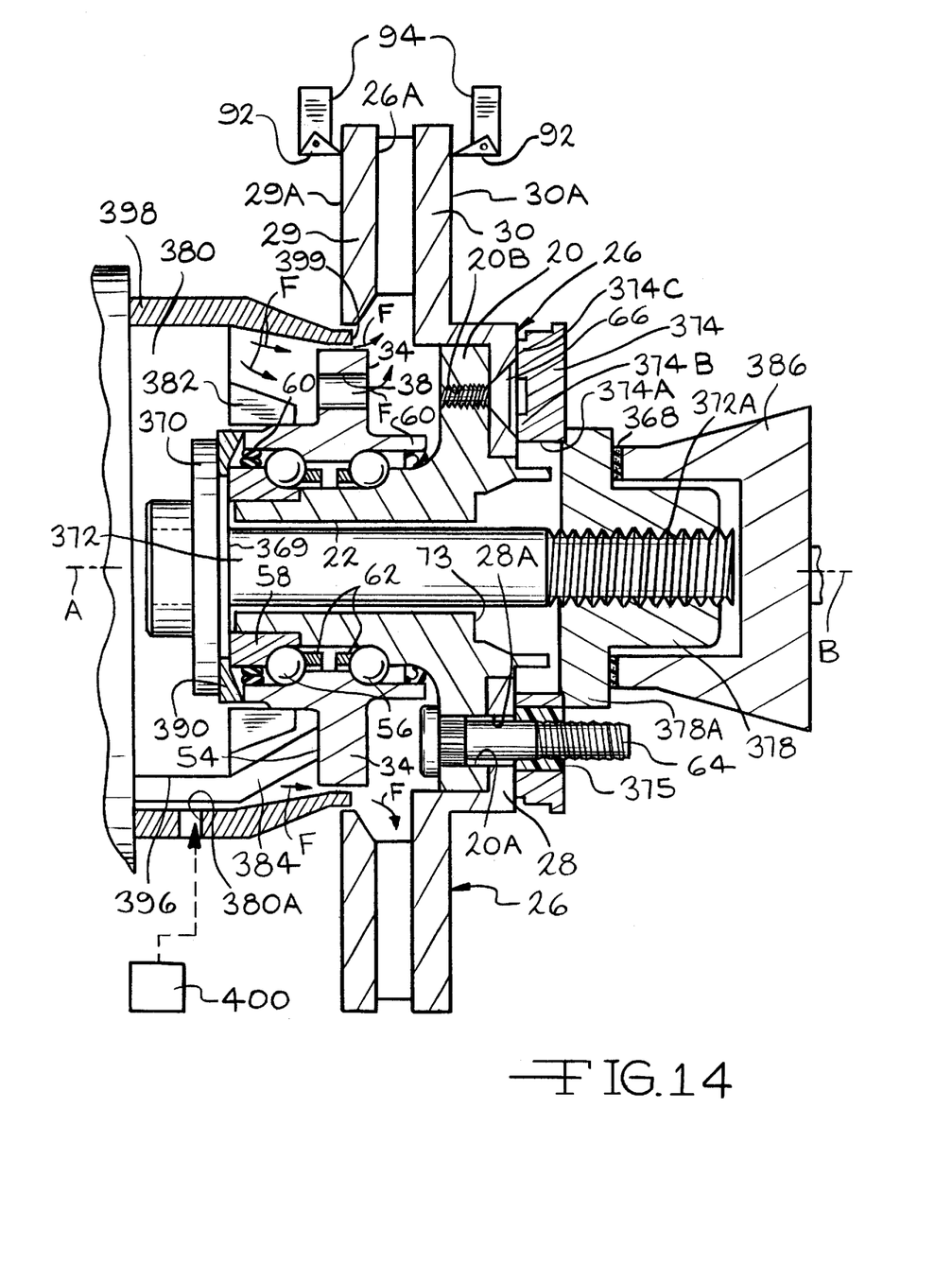
FIG. 14 is a cross sectional view of the vehicle hub, bearing and brake disc assembly illustrated in FIG. 13 disposed in a fourth embodiment of a machine for machining the brake surfaces of the brake disc in accordance with this invention.

Turning now to FIGS. 13–14, a fourth method for fabricating a vehicle hub, bearing and brake disc assembly 10 in accordance with this invention will now be discussed. The fourth method comprises various steps which may be performed in numerous different sequences.

The first step is the machining of a radially extending gage surface 54 on the bearing flange 34 of the outer race 32 of the bearing assembly 15. This is followed by disposing roller elements 56 and the outer race 32 of the bearing assembly 15 around the vehicle hub 14 with the gage surface 54 facing the drive end 16 of the vehicle hub 14. A race lock member 58 is secured to the vehicle hub 14 by a press fit to retain the bearing assembly 15 on the vehicle hub 14 under a predetermined pre-load. At the same time, seals 60 are positioned between each end of the bearing assembly 15, the vehicle hub 14, and the race lock member 58. Separators or cages 62 are also disposed between the roller elements 56.

A plurality of threaded wheel studs 64 are secured to the hub flange 20 to extend axially therefrom toward the wheel end 18 of the vehicle hub 14, the studs 64 being press fit in non-threaded holes 20A provided in the hub flange 20. As will be discussed below, the threaded ends of the studs 64 extend through openings provided in the brake disc 26 and holes provided in a vehicle wheel (not shown), as is well known in the art.

The next step is the attaching of the brake disc 26 to the vehicle hub and bearing subassembly 12, with the wheel studs 64 extending through holes 28A provided in the mounting flange 28 of the brake disc 26. The mounting flange 28 of the brake disc 26 is secured to the vehicle hub and bearing subassembly 12 by screws 66. In the illustrated embodiment, the screws 66 extend through non-threaded countersunk openings 28B provided in the mounting flange 28 of the brake disc 26. The threaded ends 66A of the screws 66 are received in the threaded openings 20B provided in the hub flange 20 to secure the brake disc 26 to the vehicle hub and bearing subassembly 12. Alternatively, other means can be used to secure the brake disc 26 to the vehicle hub and bearing subassembly 12 if so desired.

The head 370 of a fixture post 372 has an annular shoulder 369 for engaging the race lock member 58. The fixture post 372 is supported vertically for receiving the vehicle hub 14. The vehicle hub 14 is placed on the post 372 with the head 370 of the fixture post 372 in engagement with the race lock member 58 as the post 372 is inserted through the bore 22 to extend from the wheel end 18 of the vehicle hub 14. Preferably, the post 372 extends through the bore 22 of the hub 14 in a clearance fit therewith.

While in the vertical position, a pressure plate 374 is disposed about wheel end 18 and in engagement with the vehicle hub 14. The pressure plate 374 has a central opening 374A surrounding a projection 76 at the wheel end 18 of the wheel hub 14. A plurality of bushings 375 are press fit into openings 374B provided in the pressure plate 374 and surround, in spaced relationship, each of the studs 64. The bushings 375 are preferably constructed of rubber to prevent damage to the threads of the studs 64. Alternatively, the bushings 375 may be formed of other materials if so desired. The pressure plate 374 further includes a plurality of circumferentially spaced tabs 374B and 374C provided thereon. The tabs 374B and 374C are similar to the tabs described above in connection with the plate 174, best shown in FIG. 8. As a result, tabs 374B and 374C engage the mounting flange 28 of the brake disc 26 for simulating the pressure points exerted by a vehicle wheel.

A washer/nut 378 is disposed over the pressure plate 374 and in threaded engagement with a threaded end 372A of the post 372 to place the post 372 in tension between the bearing lock member 58 and the pressure plate 374 to urge the tabs 374B and 374C against the mounting flange 28 of the brake disc 26. This maintains the pre-load on and retains the bearing assembly 15 to the vehicle hub 14; this prevents the race lock member 58 from changing position to maintain the pre-loading the same as occurs when the assembly is mounted on the vehicle, as shown in FIG. 1. This also provides a clamp load between the brake disc 26 and the hub face.

This subassembly is then moved to a machining station, as shown in FIG. 14, and placed in position to be clamped or grasped by a cam chuck 380 mounted on a stationary machine. The cam chuck 380 has jaws 382 which clamp the outer race 32 of the bearing assembly 15 and draws the gage surface 54 against a gage 384 to properly orient the outer race 32 about a fixed axis A. The gage 384 is shown as engaging only one area of the circumference of the gaging surface 54; however, the gage 384 engages most of the circumference of the gaging surface 54 and includes air sensors (not shown) to confirm that the gaging surface 54 is properly oriented and engaging the gage 384 in all quadrants. The gage 384 extends through a hole 396 in the chuck 380.

Once the outer race 32 is clamped in a fixed position relative to the fixed axis A, the next step is engaging the washer portion 378A of the washer/nut 378 with a rotating member 386 to rotate the pressure plate 374 about a floating axis B. More specifically, a resilient pad 368 is sandwiched between the washer portion 378A of the washer/nut 378 and the rotating member 386 in a plane perpendicular to the floating axis B and urging the rotating member 386 against the washer portion 378A of the washer/nut 378 to compress the resilient pad 368 between the rotating member 386 and the washer portion 378A of the washer/nut 378. Accordingly, the rotating member 386 rotates about the axis B which is floating, i.e., not fixed, to allow some relative radial movement between the outer race 32 and the vehicle hub 14 or brake disc 26. The resilient pad 368 allows relative radial movement between the rotating member 386 and the pressure place 374 as the rotating member 386 is urged or forced axially into engagement with the resilient pad 368. As a result, pressure plate 374, and therefore the vehicle hub 14 and disc brake 26, are frictionally driven and rotated by the rotating member 386.

In this embodiment, an annular seal 390 is disposed between the head 370 of the fixture post 372 and the outer race 32 to prevent contaminants from entering into bearing assembly 15 during the machining of the brake disc 26, i.e., to prevent the metal removed by such machining from entering the bearing assembly 15. In addition, in this embodiment, an annular plastic ring 398 is supported annularly by the chuck 380 and extends to a taper 399 in the space between the bearing flange 34 and the inner end of the friction plate 29 of the brake disc 26 to prevent chips from the machining of the brake disc 26 from entering into the bearing assembly 15. Also, the ring 398 is operative to direct the flow of air which is normally produced by the chuck 380 in a direction (shown by arrows F) which is effective to exhaust any chips which may enter through the passageways 26A of the brake disc 26. Alternatively, a source of compressed air 400 can be provided and supplied through one or more openings 380A (only one opening 380A illustrated in this embodiment), which are provided in the chuck 380 to supplement the air normally produced by the chuck 380.

The final step is the machining of the brake surfaces 29A and 30A of the brake disc 26 while rotating the vehicle hub 14 and brake disc 26 relative to the outer race 32 of the bearing assembly 15. This machining is accomplished with cutting inserts 92 which are supported on shafts 94 disposed on opposite sides of the friction plates 29 and 30 of the brake disc 26. Thus, the brake surfaces 29A and 30A are machined in a predetermined relationship relative to the outer race 32. Subsequently, the fixture post 372 is removed and the completed vehicle hub, bearing and brake disc assembly 10 is installed onto the knuckle 36, as shown in FIG. 1.

Although the invention has been described and illustrated in connection with the particular vehicle hub, bearing and brake disc assembly 10 disclosed herein, it will be appreciated that this invention may be used in other types of vehicle hub, bearing and brake disc assemblies. For example, the hub may be of a different construction, the bearing may be of a different construction, and/or the brake disc may be of a different construction if so desired. Also, while the annular seal 290, 390 the plastic ring 298, 398, and the air means 400 have been shown in the method of the third and/or the fourth embodiments of this invention, the seal 290, 390 and/or the ring 298, 398, and/or the air means 400 can be used in any of the other embodiments disclosed herein if so desired.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A method for producing a vehicle hub, bearing and brake disc assembly comprising the steps of:

(a) providing a vehicle hub including a hub flange;

(b) providing a bearing assembly having an outer race;

(c) installing the bearing assembly about the vehicle hub;

(d) providing a separately formed brake disc having a brake surface;

(e) securing the brake disc to the hub flange of the vehicle hub to produce a vehicle hub, bearing and brake disc assembly;

(f) supporting the vehicle hub, bearing and brake disc assembly on a machining apparatus; and (g) using the machining apparatus to machine the brake surface of the brake disc of the vehicle hub, bearing and brake disc assembly relative to the outer race of the bearing assembly whereby the brake surface is oriented in a predetermined relationship relative to the outer race of the bearing assembly.

2. The method according to claim 1 wherein step (f) includes supporting the vehicle hub, bearing and brake disc assembly on a fixed axis, and step (g) includes rotating the vehicle hub, bearing and brake disc assembly by a rotating member disposed on a non-fixed axis.

3. The method according to claim 1 wherein prior to step (f) the step of securing a plate to the vehicle hub, bearing and brake disc assembly, the plate disposed about the wheel end of the vehicle hub and in engagement with a portion of the mounting flange of the brake disc, and step (f) includes driving the plate with a rotating member of the machining apparatus.

4. The method according to claim 3 wherein the vehicle hub, bearing and brake disc assembly and plate are supported on a stationary machine fixture in order to orient the outer race about a fixed axis, and step (g) includes engaging and driving the plate with a rotating member supported on a non-fixed axis in order to rotate the plate about the non-fixed axis during the machining of the brake surface of the brake disc.

5. The method according to claim 3 wherein the vehicle hub, bearing and brake disc assembly and plate are supported on a stationary machine fixture in order to orient the outer race about a fixed axis, and step (g) includes engaging and driving the plate with a rotating member supported on a non-fixed axis in order to rotate the plate about the non-fixed axis during the machining of the brake surface of the brake disc.

6. The method according to claim 1 wherein prior to step (f) the step of securing a plate to the vehicle hub, bearing and brake disc assembly, the plate disposed about the wheel end of the vehicle hub and in engagement with a portion of the vehicle hub, and step (f) includes driving the plate with a rotating member of the machining apparatus.

7. The method according to claim 1 wherein step (f) includes providing seal means to prevent chips from entering into the bearing assembly during step (g).

8. The method according to claim 7 and further including providing air means which is operative to exhaust chips from the area of the bearing assembly during step (g).

9. A method for producing a vehicle hub, bearing and brake disc assembly comprising the steps of:

(a) providing a vehicle hub including a hub flange and a bore extending between a drive end and a wheel end of the vehicle hub;

(b) providing a bearing assembly having an outer race, the outer race including a bearing flange;

(c) installing the bearing assembly about the vehicle hub;

(d) providing a separately formed brake disc including a mounting flange and a pair of opposed friction plates, the friction plates defining a pair of opposed generally parallel brake surfaces;

(e) securing the brake disc to the hub flange of the vehicle hub to produce a vehicle hub, bearing and brake disc assembly;

(f) providing a plate disposed about the wheel end of the vehicle hub;

(g) providing a fixture post having a first end disposed adjacent the drive end of the vehicle hub and a second end disposed wheel end of the vehicle hub;

(h) installing a fastener on the second end of the fixture post, the fastener operative to secure the plate to the vehicle hub, bearing and brake disc assembly and to apply a preload to the bearing assembly;

(i) supporting the vehicle hub, bearing and brake disc assembly while on the fixture post on a machining apparatus;

(j) using the machining apparatus to machine the brake surfaces of the brake disc relative to the outer race of the bearing assembly whereby the brake surfaces are oriented in a predetermined relationship relative to the outer race of the bearing assembly; and (k) removing the fastener, fixture post, and the annular plate to thereby produce the finished vehicle hub, bearing and brake disc assembly.

10. The method according to claim 9 wherein the plate of step (f) is disposed in engagement with a portion of the mounting flange of the brake disc.

11. The method according to claim 10 wherein the plate includes a plurality of tabs provided thereon, the tabs adapted to engage the mounting flange of the brake disc to simulate the pressure points exerted by a vehicle wheel attached to the brake disc.

12. The method according to claim 9 wherein the plate is disposed in engagement with a portion of the vehicle hub.

13. The method according to claim 9 wherein step (i) includes clamping the outer race of the bearing assembly by jaws of a cam chuck mounted on a stationary machine fixture in order to orient the outer race about a fixed axis, and step (j) includes engaging and driving the plate with a rotating member supported on a non-fixed axis in order to rotate the plate about the non-fixed axis.

14. The method according to claim 13 wherein a resilient pad is disposed between the plate and the rotating member.

15. The method according to claim 9 wherein a seal is disposed between the first end of the fixture post and the outer race of the bearing assembly to prevent chips from entering into bearing assembly during step (j).

16. The method according to claim 9 wherein a protective member is disposed between the bearing flange of the outer race and an inner end of one of friction plates of the brake disc to prevent chips from entering into the bearing assembly during step (j).

17. The method according to claim 9 wherein seal means are provided to prevent chips from entering into the bearing assembly during step (j), and air means are provided to exhaust chips from the area of the bearing assembly during step (j).

18. A method for producing a front corner assembly comprising the steps of:

(a) providing a vehicle hub including a hub flange;

(b) providing a bearing assembly including an outer race having a bearing flange;

(c) installing the bearing assembly about the vehicle hub;

(d) providing a separately formed brake disc having a brake surface;

(e) securing the brake disc to the hub flange of the vehicle hub to produce a vehicle hub, bearing and brake disc assembly;

(f) supporting the vehicle hub, bearing and brake disc assembly on a machining apparatus;

(g) using the machining apparatus to machine the brake surface of the brake disc relative to the outer face of the bearing assembly whereby the brake surface is oriented in a predetermined relationship relative to the outer race of the bearing assembly; and (h) securing a steering knuckle to the bearing flange of the outer race bearing assembly to thereby produce the finished front corner assembly.

19. The front corner assembly produced according to claim 18 wherein step (f) includes supporting the vehicle hub, bearing and brake disc assembly on a fixed axis, and step (g) includes rotating the vehicle hub, bearing and brake disc assembly by a rotating member disposed on a non-fixed axis.

20. The front corner assembly produced according to claim 18 wherein threaded wheel studs are secured to the hub flange and extend axially through openings provided in the mounting flange of the brake disc for securing a vehicle wheel to the front corner assembly.

* * * * *